(12) United States Patent
Adams

(10) Patent No.: US 9,366,322 B2
(45) Date of Patent: Jun. 14, 2016

(54) TENSIONER AND SHOE THEREFOR

(75) Inventor: Bradley F. Adams, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 17 days.

(21) Appl. No.: 14/118,384

(22) PCT Filed: May 16, 2012

(86) PCT No.: PCT/US2012/038041
§ 371 (c)(1),
(2), (4) Date: Nov. 18, 2013

(87) PCT Pub. No.: WO2012/166358
PCT Pub. Date: Dec. 6, 2012

(65) Prior Publication Data
US 2014/0106913 A1 Apr. 17, 2014

Related U.S. Application Data

(60) Provisional application No. 61/493,131, filed on Jun. 3, 2011.

(51) Int. Cl.
*F16H 7/08* (2006.01)
*F16H 7/22* (2006.01)
*F16H 7/18* (2006.01)

(52) U.S. Cl.
CPC .. F16H 7/08 (2013.01); F16H 7/18 (2013.01); *F16H 2007/0872* (2013.01); *F16H 2007/0891* (2013.01)

(58) Field of Classification Search
CPC ..... F16H 2007/0872; F16H 7/08; F16H 7/18; F16H 2007/0804; F16H 2007/0806
USPC ................................... 474/110, 111
See application file for complete search history.

(56) References Cited

U.S. PATENT DOCUMENTS

| 2,963,918 | A | * | 12/1960 | Blakstad ........................ 474/111 |
| 3,407,674 | A | * | 10/1968 | Pearce et al. .................. 474/111 |
| 3,626,776 | A | * | 12/1971 | Staudinger et al. ............. 74/111 |
| 3,710,634 | A | * | 1/1973 | Tamaru et al. ................ 474/111 |
| 3,802,286 | A | * | 4/1974 | Winklhofer et al. .......... 474/111 |
| 3,812,733 | A | * | 5/1974 | Yoshida ........................ 474/111 |
| 3,964,331 | A | * | 6/1976 | Oldfield ........................ 474/110 |
| 4,747,811 | A | * | 5/1988 | Sawafuji et al. .............. 474/135 |
| 4,832,664 | A | * | 5/1989 | Groger et al. ................. 474/111 |
| 4,838,840 | A | * | 6/1989 | Mutoh et al. .................. 474/138 |

(Continued)

FOREIGN PATENT DOCUMENTS

| EP | 0483564 A1 | 5/1992 |
| JP | 2000337462 A | 12/2000 |
| KR | 100969039 B1 | 7/2010 |

OTHER PUBLICATIONS

International Search Report and Written Opinion ; date of mailing , Jan. 7, 2013 ; for International Application No. PCT/US2012/038041 ; 8 pages.

(Continued)

*Primary Examiner* — Henry Liu
(74) *Attorney, Agent, or Firm* — BrooksGroup

(57) ABSTRACT

One embodiment includes a tensioner that includes a housing, a piston, and a shoe. The piston extends from the housing. The shoe is carried by the piston and has a recess. The recess receives a portion or more of the piston.

16 Claims, 3 Drawing Sheets

(56) References Cited

U.S. PATENT DOCUMENTS

| | | | |
|---|---|---|---|
| 5,030,170 A * | 7/1991 | Ojima | 474/111 |
| 5,088,966 A * | 2/1992 | Suzuki et al. | 474/111 |
| 5,197,420 A * | 3/1993 | Arnold et al. | 123/90.15 |
| 5,248,282 A * | 9/1993 | Suzuki | F16H 7/08 474/110 |
| 5,277,664 A | 1/1994 | Mott | |
| 5,595,549 A * | 1/1997 | Jarrand | 474/91 |
| 5,597,367 A * | 1/1997 | Trzmiel et al. | 474/110 |
| 5,601,505 A * | 2/1997 | Tada | 474/110 |
| 5,606,941 A * | 3/1997 | Trzmiel et al. | 123/90.15 |
| 5,628,701 A * | 5/1997 | Dembosky et al. | 474/103 |
| 5,643,117 A | 7/1997 | Dembosky | |
| 5,653,653 A * | 8/1997 | Ledvina | 474/110 |
| 5,782,625 A * | 7/1998 | Young | 474/138 |
| 5,797,817 A * | 8/1998 | Senftleben et al. | 474/110 |
| 5,885,179 A * | 3/1999 | Lewis et al. | 474/110 |
| 6,093,123 A * | 7/2000 | Baddaria et al. | 474/110 |
| 6,482,116 B1 * | 11/2002 | Ullein | 474/111 |
| 6,602,154 B1 * | 8/2003 | Guichard et al. | 474/110 |
| 6,852,049 B2 | 2/2005 | Markley et al. | |
| 7,473,197 B2 * | 1/2009 | Le et al. | 474/111 |
| 7,641,576 B2 * | 1/2010 | Redaelli et al. | 474/109 |
| 7,850,559 B2 * | 12/2010 | Botez et al. | 474/110 |
| 7,942,769 B2 * | 5/2011 | Pflug et al. | 474/91 |
| 8,523,720 B2 * | 9/2013 | Reinhart et al. | 474/110 |
| 8,696,501 B2 * | 4/2014 | Ullein et al. | 474/111 |
| 2002/0165056 A1 * | 11/2002 | Ullein | 474/110 |
| 2004/0067806 A1 * | 4/2004 | Markley et al. | 474/110 |
| 2005/0054467 A1 * | 3/2005 | Le et al. | 474/111 |
| 2007/0021251 A1 * | 1/2007 | Redaelli et al. | 474/109 |
| 2008/0318716 A1 * | 12/2008 | Ullein | F16H 7/08 474/110 |
| 2009/0197720 A1 * | 8/2009 | Aurhammer et al. | 474/110 |
| 2009/0239692 A1 * | 9/2009 | Heinrich et al. | 474/111 |
| 2011/0003657 A1 * | 1/2011 | Reinhart et al. | 474/110 |

OTHER PUBLICATIONS

Tensioner; from Wikipedia, http://en.wikipedia.org/wiki/Tensioner; 1 page.

Borg Warner Products; http://www.borgwarner.com/_layouts/borgwarner/printpreview.aspx; 2 pages.

* cited by examiner

TENSIONER AND SHOE THEREFOR

CROSS-REFERENCE TO RELATED APPLICATIONS

This application claims the benefit of U.S. Provisional Application Ser. No. 61/493,131 filed Jun. 3, 2011.

TECHNICAL FIELD

The technical field generally relates to tensioners and to tensioner shoes.

BACKGROUND

Tensioners, such as hydraulic, spring-loaded, or a combination thereof, are commonly equipped in systems to help keep a system chain taut by taking up slack in the system chain. Tensioners can also help direct the system chain along its path of travel. Tensioners are commonly used in automotive timing or driving systems such as internal combustion engine applications and powertrain applications. For example, an engine timing system chain transfers rotation from a crankshaft to a camshaft, and can also drive other components such as an oil pump, water pump, and/or fuel injection pump.

SUMMARY OF ILLUSTRATIVE EMBODIMENTS

One illustrative embodiment includes a tensioner that may include a housing, a piston, and a shoe. The piston may extend from the housing. The shoe may be carried by the piston. The shoe may have a working surface that bears against a system chain during use of the tensioner. The shoe may have a first side surface and may have a second side surface that is located opposite the first side surface. The shoe may have a recess that may receive a portion or more of the piston. The recess may have an open end that is located in the first side surface. The recess may have a closed end that is located opposite the open end of the recess. The closed end may be generally in a direction toward the second side surface.

One illustrative embodiment includes a tensioner that may include a housing, a piston, a plate, and a shoe. The piston may extend from the housing. The plate may be carried by the piston. The shoe may be carried by the plate. The shoe may have a working portion that bears against a system chain during use of the tensioner. The shoe may have a base portion that is located opposite the working portion. The base portion may have a front portion and may have a back portion. The base portion may have a bridge portion that may extend between the front and back portions. The shoe may have a hole that may receive a portion or more of the plate. The hole may be located between the working and base portions. The shoe may have a recess that may receive a portion or more of the piston. The recess may be located in the base portion and may be defined in part by the front portion, by the back portion, and by the bridge portion.

One illustrative embodiment includes a tensioner shoe that may be constructed and arranged to be carried by a plate and by a piston of a tensioner. The tensioner shoe may have a working portion and may have a working surface that bears against a system chain during use of the tensioner shoe. The tensioner shoe may have a base portion that is located opposite the working portion, and the tensioner shoe may have a base surface. The base portion may have a front portion and may have a back portion. The base portion may have a bridge portion that may extend between the front and back portions. The tensioner shoe may have a first side surface and may have a second side surface that is located opposite the first side surface. The tensioner shoe may have a hole that may be constructed and arranged to receive a portion or more of the plate. The hole may extend between the first and second side surfaces. The tensioner shoe may have a recess that may be constructed and arranged to receive a portion or more of the piston. The recess may be defined in part by the front portion, by the back portion, and by the bridge portion. The recess may have a surface that may be shaped complementary to an outer surface of the piston. The surface of the recess may be constructed and arranged to bear against a portion of the outer surface of the piston during use of the tensioner shoe.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the present disclosure will become more fully understood from the detailed description and the accompanying drawings, wherein.

DETAILED DESCRIPTION OF ILLUSTRATIVE EMBODIMENTS

The following description of the embodiment(s) is merely illustrative in nature and is in no way intended to limit the invention, its application, or its uses.

Figure 1:
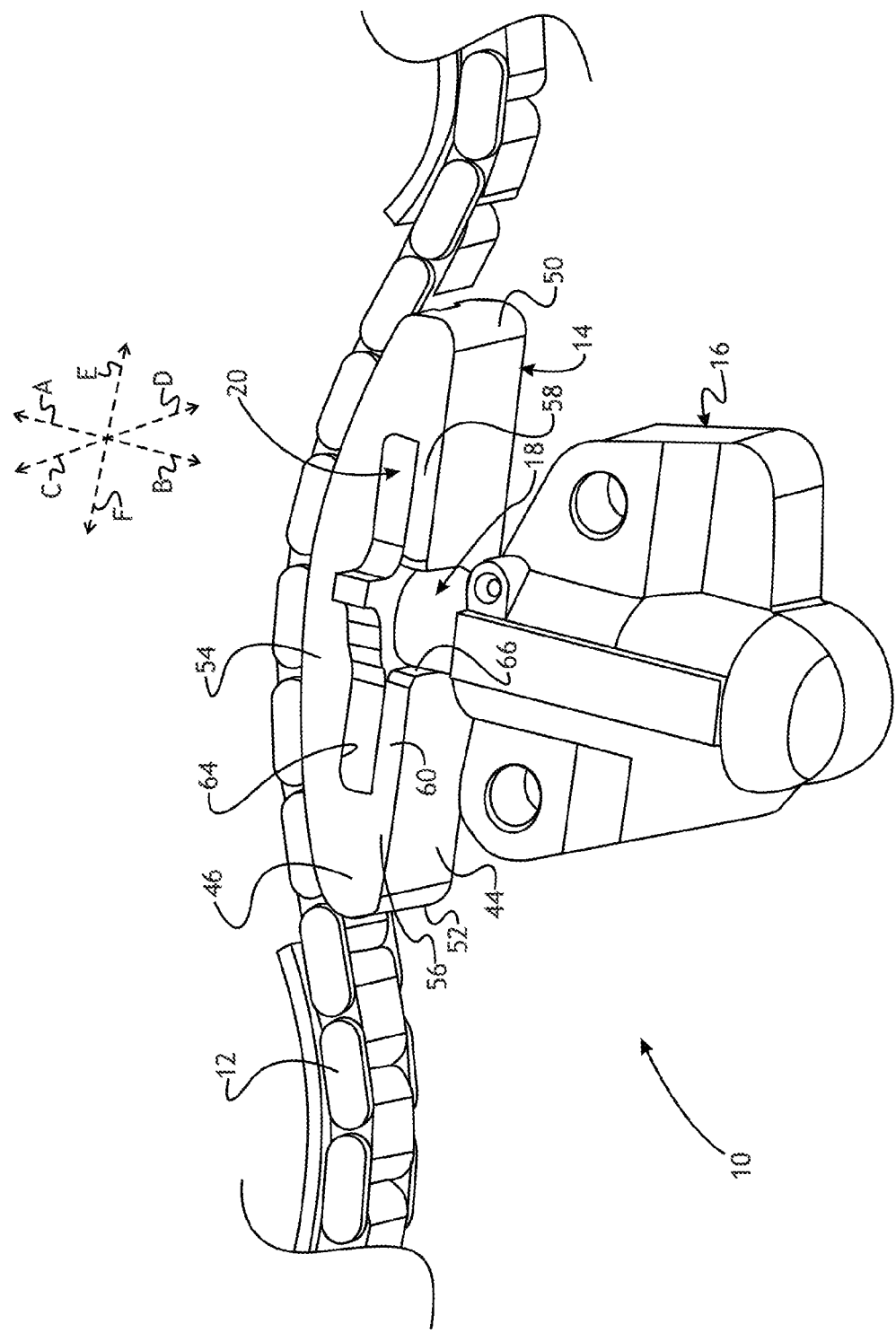
FIG. 1 is a perspective view of an embodiment of a tensioner.

The figures illustrate an embodiment of a tensioner 10 that can be equipped in a system to help keep a system chain 12 taut by taking up slack in the system chain. Example systems include automotive timing and driving systems in an internal combustion engine application and a powertrain application. Other vehicle applications are contemplated including non-automotive applications such as watercraft and aircraft applications. To aid this description, a directional coordinate system is shown in FIG. 1. The directional coordinate system is in general reference to a shoe 14 of the tensioner 10, and depicts a vertical direction with an upward direction A and a downward direction B; a lateral direction with a first lateral direction C and a second lateral direction D; and a longitudinal direction with a fore direction E and an aft direction F.

In the illustrated embodiment of FIGS. 1-4, the tensioner 10 may include a housing 16, a piston 18, a plate 20, and the shoe 14. The housing 16 may be mounted to a component of the system in which the tensioner 10 is used, and may support the piston 18. Inside, the housing 16 may accommodate components that provide the urging-functionality of the piston 18 including—depending on whether a hydraulic, spring-loaded, or other functionality—support of a spring, a chamber for hydraulic or pneumatic fluid, or electrical wiring and electrical component structures. For mounting, the housing 16 may be constructed to receive fasteners, or may be constructed for other ways of mounting. The housing 16 may also be constructed to accept hydraulic or pneumatic lines.

Figure 2:
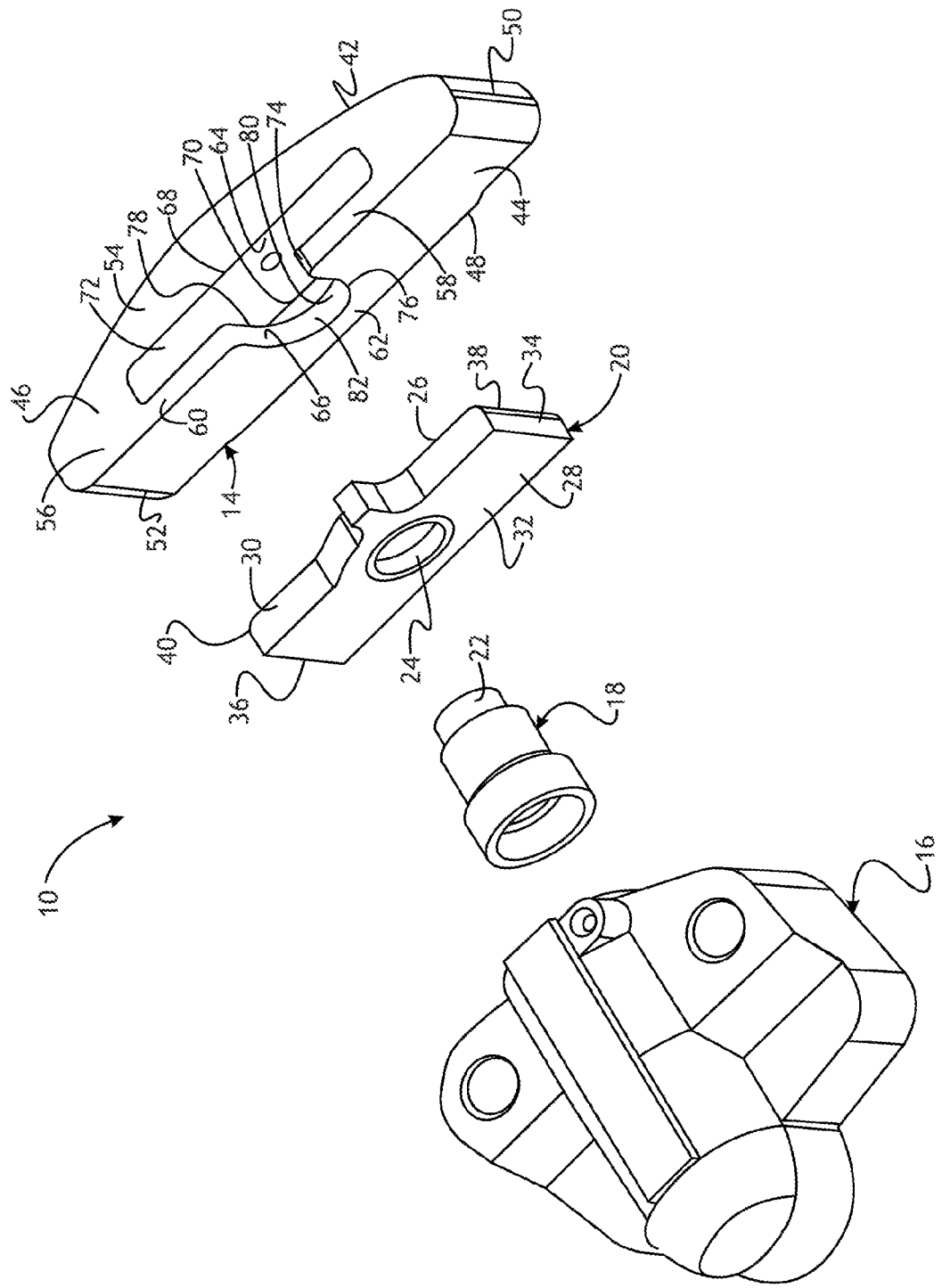
FIG. 2 is an exploded view of the tensioner of FIG. 1.
Figure 4:
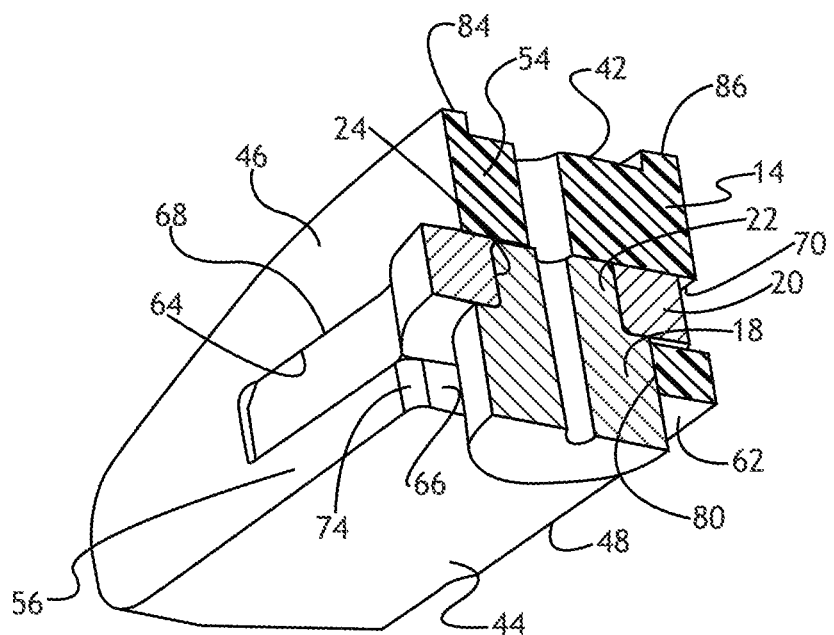
FIG. 4 is a perspective cross-sectional view generally taken at line 4-4 in FIG. 3.

The piston 18, also called a plunger, may extend from the housing 16 and may selectively provide an urging force in the upward direction A. The piston 18 may reciprocate vertically in the upward and downward directions A, B. The piston 18 may be made of a metal material such as steel. Referring to FIGS. 2 and 4, the piston 18 may have a generally cylindrical shape, and may have a radially-reduced free end portion 22 that, in assembly, receives the plate 20 for a press-fit connection. Other types of connections are possible between the piston 18 and the plate 20 including a snap-fit connection or a welding connection.

The plate 20 may be carried by the piston 18, and may itself carry the shoe 14. In assembly, the plate 20 may provide a load-supporting and skeleton framework for the shoe 14. The plate 20 may be made of a metal material such as steel. Referring to FIGS. 2 and 4, the plate 20 may have a generally rectangular shape and may be elongated in the longitudinal direction. Unlike some known plates, the rectangular shape of the plate 20 may not have notches or other indents at its outside corners that have been used to aid reception in an associated shoe; though the plate 20 may have notches or cutouts in other embodiments. The plate 20 may have a bore 24 that receives the radially-reduced free end portion 22 of the piston 18. The plate 20 may have a generally planar top surface 26, a generally planar bottom surface 28, a generally planar first side surface 30, a generally planar second side surface 32, a generally planar front surface 34, and a generally planar back surface 36. In order to minimize stress concentration, an edge defined at the intersection of the top surface 26 and the front surface 34 may have a fillet radius or a first chamfer 38 extending from corner-to-corner, and an edge defined at the intersection of the top surface and the back surface 36 may have a fillet radius or a second chamfer 40 extending from corner-to-corner.

The shoe 14 may be carried by the plate 20 and by the piston 18, and may be urged in the upward direction A during use of the tensioner 10. The shoe 14 may be constructed and arranged to make direct contact with the system chain 12; in other words, the system chain may be kept taut via direct and continuous abutment with the shoe, and may ride against the shoe as the system chain travels in operation. The shoe 14 may have a one-piece structure and body, may be made of a plastic material, and may be manufactured by an injection molding process. Referring to FIGS. 1, 2, and 4, the shoe 14 may have a generally arcuate or rectangular shape. The shoe 14 may have a generally arcuate working surface 42 in profile, and may have a generally planar base surface 44 located opposite the working surface with respect to the vertical direction. In use of the tensioner 10, the working surface 42 may make surface-to-surface direct contact with the system chain 12. The base surface 44, on the other hand, may be in general confrontation with the housing 16. The shoe 14 may also have a generally planar first side surface 46 in profile, and a generally planar second side surface 48 in profile located opposite the first side surface with respect to the lateral direction. The first side surface 46 may face in the first lateral direction C, and the second side surface 48 may face in the second lateral direction D. And in the longitudinal direction, the shoe 14 may have a generally rounded front surface 50 in profile, and may have a generally rounded back surface 52 in profile.

Still referring to FIGS. 1, 2, and 4, the shoe 14 may be described with respect to different portions. For example, the shoe 14 may have a working portion 54 and a base portion 56 located opposite the working portion with respect to the vertical direction. The working portion 54 may constitute a part of the shoe 14 that is worked by the system chain 12—for example, the working portion may undergo wear caused by endured engagement with the system chain. The base portion 56 may have a front portion 58, a back portion 60, and a bridge portion 62. The front portion 58 may be generally located in the fore-most direction of the base portion 56, and the back portion 60 may be generally located in the aft-most direction of the base portion. The bridge portion 62 may extend between the front and back portions 58, 60. By way of the bridge portion 62, the base portion 56 may have a continuous structure in the longitudinal direction between the front and back surfaces 50, 52. As will be described, the bridge portion 62 may engage the piston 18 in assembly and during use of the tensioner 10.

The shoe 14 may further have a hole 64 and a recess 66. The hole 64 may be constructed and arranged to receive a portion or more of the plate 20 when the shoe 14 is carried by the plate. The hole 64 may have a generally rectangular shape that may be complementary to the shape of the plate 20. The hole 64 may span completely through the shoe 14 in the lateral direction between the first and second side surfaces 46, 48. At the first side surface 46 the hole 64 may have a first open end 68, and at the second side surface 48 the hole 64 may have a second open end 70. The hole 64 may be defined by an interior surface 72 having a top surface, a bottom surface, a front surface, and a back surface.

The recess 66 may be constructed and arranged to receive a portion of the piston 18 when the tensioner 10 is assembled via a snap-fit, press-fit, or easy-slide-fit. Still referring to FIGS. 1, 2, and 4, the recess 66 may have a generally partial-cylindrical or arcuate shape, and may be generally shaped complementary to the piston 18 in order to receive a portion of the piston. The recess 66 may be defined in part by the front portion 58, by the back portion 60, and by the bridge portion 62, and the recess may communicate with and may be open to the hole 64 in the upward direction A. The recess 66 may have a mouth or first open end 74 at the first side surface 46 that initially receives the piston 18, may have a second open end 76 at the base surface 44, may have a third open end 78 at the interior surface 72 where the recess is open to the hole 64, and may have a closed end 80 at the bridge portion 62. The recess 66 may be an area partially confined by, and partially defined by, an interior surface 82. The interior surface 82 may span the front portion 58, the back portion 60, and the bridge portion 62. In assembly and operation, the interior surface 82 may directly confront a portion of the outer surface of the piston 18, and may directly bear against and make surface-to-surface contact with a portion of the outer surface of the piston. In a sense, the interior surface 82 may wrap around or follow a portion of the outer surface of the piston 18.

Referring to FIG. 4, the shoe 14 may further have a first rail 84 and a second rail 86 to help guide the system chain 12 over the working surface 42; in other embodiments, the shoe need not have rails.

Figure 3:
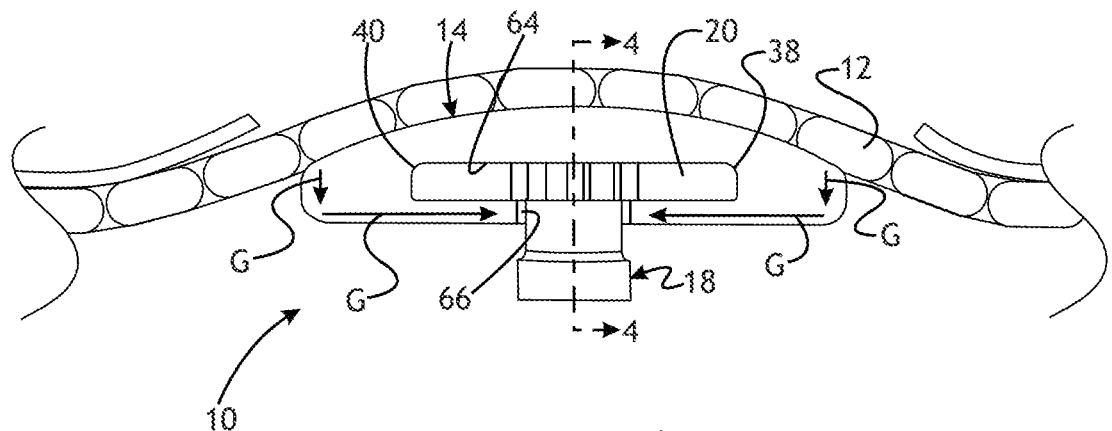
FIG. 3 is a side view of the tensioner of FIG. 1.

In use, the shoe 14 may wear less and thus may be used for a longer period of time compared to known shoe designs. Referring to FIG. 3, some of the load exerted by the system chain 12 to the shoe 14 may be transferred and distributed to the piston 18. In some cases, a greatest load G withstood by the shoe 14 may be exerted at the extreme fore and aft locations of the working surface 42. In known shoe designs, the greatest degree of wear may take place at these extreme fore and aft locations and beyond the longitudinal extent of the plate 20. In the shoe 14 of the illustrated embodiment, the load G may be transferred to and may be borne by the piston 18 in the general fore and aft directions E, F (as generally shown by the arrows G in FIG. 3). The load G may be distributed to the piston 18 via the front portion 58, the back portion 60, and the bridge portion 62. As such, the shoe 14 itself may endure less of the load G and may wear resultingly less at the extreme fore and aft locations and elsewhere over the lifetime of the tensioner 10, as compared to known designs where a lesser degree of, or none of, the load is borne by the piston. The shoe 14 of the illustrated embodiment accordingly may allow a plate design (i.e., plate 20) of shortened longitudinal length, as the shoe 14 may require less of the supporting framework provided by the plate 20 at the fore and aft locations.

In another embodiment not shown in the figures, the tensioner 10 does not include the plate 20, and therefore the shoe 14 does not have the hole 64 that receives the plate. In this embodiment, the shoe 14 may have the recess 66 and may be carried by the piston 18 via direct connection therewith such as by a snap-fit connection, a press-fit connection, or some other connection between the piston and the shoe.

The following is a description of select illustrative embodiments within the scope of the invention. The invention is not, however, limited to this description; and each embodiment and components, elements, and steps within each embodiment may be used alone or in combination with any of the other embodiments and components, elements, and steps within the other embodiments.

Embodiment one may include a tensioner. The tensioner may include a housing, a piston, and a shoe. The piston may extend from the housing. The shoe may be carried by the piston. The shoe may have a working surface that may bear against a system chain during use of the tensioner. The shoe may have a first side surface and may have a second side surface that is located opposite the first side surface. The shoe may have a recess that may receive a portion or more of the piston. The recess may have an open end located in the first side surface, and the recess may have a closed end located opposite its open end in a direction toward the second side surface.

Embodiment two, which may be combined with embodiment one, further describe the tensioner as including a plate carried by the piston, the shoe may be carried by the plate, the shoe may have a hole receiving a portion or more of the plate, the hole may have an open end located in the first side surface, and the recess may be open to the hole in a direction toward the working surface.

Embodiment three, which may be combined with any one of embodiments one and two, further describes the tensioner as a hydraulically-operated tensioner.

Embodiment four, which may be combined with any one of embodiments one to three, further describes the plate as having a top surface, a front surface, and a back surface. Further, the plate may have a first chamfer on an edge located at an intersection of the top surface and the front surface. And the plate may have a second chamfer on an edge located at an intersection of the top surface and the back surface.

Embodiment five, which may be combined with any one of embodiments one to four, further describes the plate as having a generally rectangular shape and being free of notches at its four outside corners.

Embodiment six, which may be combined with any one of embodiments one to five, further describes the hole as having a second open end located in the second side surface.

Embodiment seven, which may be combined with any one of embodiments one to six, further describes the recess as having a second open end located in a base surface of the shoe.

Embodiment eight, which may be combined with any one of embodiments one to seven, further describes the shoe as having a bridge portion located in a base portion of the shoe. And the bridge portion may have a first surface in the direction toward the working surface, and may have a second surface in the direction toward the first side surface. Further, the first surface may define an area of the hole, and the second surface may define an area of the recess.

Embodiment nine may include a tensioner. The tensioner may include a housing, a piston, a plate, and a shoe. The piston may extend from the housing. The plate may be carried by the piston. The shoe may be carried by the plate. The shoe may have a working portion that may bear against a system chain during use of the tensioner. The shoe may have a base portion located opposite the working portion. The base portion may have a front portion and a back portion. The base portion may have a bridge portion extending between the front and back portions. The shoe may have a hole that may receive a portion or more of the plate. The hole may be located between the working and base portions. The shoe may have a recess that may receive a portion or more of the piston. The recess may be located in the base portion, and may be defined in part by the front portion, by the back portion, and by the bridge portion.

Embodiment ten, which may be combined with embodiment nine, further describes the tensioner as being a hydraulically-operated tensioner that is equipped in an automotive system.

Embodiment eleven, which may be combined with any one of embodiments nine and ten, further describes the hole as extending through the shoe between a first and second side surface of the shoe.

Embodiment twelve, which may be combined with any one of embodiments nine to eleven, further describes the recess as defined in part by a surface shaped complementary to an outer surface of the piston. Further, the surface of the recess may confront a portion or more of the outer surface of the piston. And the surface of the recess may bear against a portion of the outer surface of the piston.

Embodiment thirteen, which may be combined with any one of embodiments nine to twelve, further describes the piston as making contact with the bridge portion by way of the recess. Further, the piston may make contact with the front portion by way of the recess, and the piston may make contact with the back portion by way of the recess.

Embodiment fourteen may include a tensioner shoe. The tensioner shoe may be constructed and arranged to be carried by a plate and a piston of a tensioner. The tensioner shoe may have a working portion and a working surface that may bear against a system chain during use of the tensioner shoe. The tensioner shoe may have a base portion located opposite the working portion, and the tensioner shoe may have a base surface. The base portion may have a front portion and may have a back portion. The base portion may have a bridge portion extending between the front and back portions. The tensioner shoe may have a first side surface and may have a second side surface located opposite the first side surface. The tensioner shoe may have a hole constructed and arranged to receive a portion or more of the plate. The hole may extend between the first and second side surfaces. The tensioner shoe may have a recess constructed and arranged to receive a portion or more of the piston. The recess may be defined in part by the front portion, the back portion, and the bridge portion. The recess may have a surface that is shaped complementary to an outer surface of the piston. The surface of the recess may be constructed and arranged to bear against a portion of the outer surface of the piston during use of the tensioner shoe.

Embodiment fifteen, which may be combined with embodiment fourteen, further describes the tensioner shoe as having a one-piece structure comprised of a plastic material.

Embodiment sixteen, which may be combined with embodiments fourteen and fifteen, further describes the hole as having a first open end at the first side surface and having a second open end at the second side surface. Further, the recess may have a first open end at the first side surface, the recess may have a second open end at the base surface, and the recess may have a third open end at the hole.

The above description of embodiments of the invention is merely illustrative in nature and, thus, variations thereof are not to be regarded as a departure from the spirit and scope of the invention.

What is claimed is:

1. A product comprising:
a tensioner including a housing, a piston extending from the housing, and a shoe carried by the piston, the shoe having a working surface which makes direct contact with a system chain during use of the tensioner, the shoe having a first side surface and a second side surface located opposite the first side surface, the shoe having a recess receiving at least a portion of the piston, the recess having an open end located in the first side surface, and the recess having a closed end opposite its open end in a direction toward the second side surface and wherein the tensioner includes a plate carried by the piston, the shoe is carried by the plate, the shoe has a hole receiving at least a portion of the plate, the hole has an open end located in the first side surface, and the recess is open to the hole in a direction toward the working surface wherein the hole has a second open end located in the second side surface.

2. A product as set forth in claim 1 wherein the tensioner is a hydraulically-operated tensioner.

3. A product as set forth in claim 1 wherein the plate has a top surface, a front surface, and a back surface, the plate having a first chamfer on an edge located at an intersection of the top surface and the front surface, and the plate having a second chamfer on an edge located at an intersection of the top surface and the back surface.

4. A product as set forth in claim 1 wherein the plate has a generally rectangular shape that is free of notches at its four outside corners.

5. A product as set forth in claim 1 wherein the recess has a second open end located in a base surface of the shoe, the base surface being located opposite the working surface.

6. A product as set forth in claim 1 wherein the shoe has a bridge portion located in a base portion of the shoe, the bridge portion having a first surface in a direction toward the working surface and having a second surface in a direction toward the first side surface, the first surface defining an area of the hole, and the second surface defining an area of the recess.

7. A product comprising:
a tensioner including a housing, a piston extending from the housing, a plate carried by the piston, and a shoe carried by the plate, the shoe having a working portion that directly contacts a system chain during use of the tensioner, the shoe having a base portion opposite the working portion, the base portion having a front portion and a back portion, the base portion having a bridge portion extending between the front and back portions, the shoe having a hole that receives at least a portion of the plate, the hole located between the working and base portions, the shoe having a recess that receives at least a portion of the piston, the recess located in the base portion and being defined in part by the front portion, back portion, and bridge portion of the base portion and wherein the plate further comprises a top surface, a front surface, and a back surface, the plate having a first chamfer on an edge located at an intersection of the top surface and the front surface, and the plate having a second chamfer on an edge located at an intersection of the top surface and the back surface.

8. A product as set forth in claim 7 wherein the tensioner is a hydraulically-operated tensioner that is equipped in an automotive system.

9. A product as set forth in claim 7 wherein the hole extends through the shoe between a first side surface and a second side surface of the shoe.

10. A product as set forth in claim 7 wherein the recess is defined in part by a surface shaped complementary to an outer surface of the piston, wherein the surface of the recess confronts a portion of the outer surface of the piston, and wherein the surface of the recess bears against a portion of the outer surface of the piston.

11. A product as set forth in claim 7 wherein, in assembly, the piston makes contact with the bridge portion via the recess, the piston makes contact with the front portion via the recess, and the piston makes contact with the back portion via the recess.

12. A product comprising:
a tensioner shoe constructed and arranged to be carried by a plate and a piston of a tensioner, the tensioner shoe having a working portion and a working surface that directly contacts a system chain during use of the tensioner shoe, the tensioner shoe having a base portion located opposite the working portion and the tensioner shoe having a base surface, the base portion having a front portion and a back portion, the base portion having a bridge portion extending between the front and back portions, the tensioner shoe having a first side surface and a second side surface located opposite the first side surface, the tensioner shoe having a hole constructed and arranged to receive at least a portion of the plate, the hole extending between the first and second side surfaces, the tensioner shoe having a recess constructed and arranged to receive at least a portion of the piston, the recess being defined in part by the front portion, the back portion, and the bridge portion, the recess having a surface that is shaped complementary to an outer surface of the piston, the surface of the recess constructed and arranged to bear against a portion of the outer surface of the piston during use of the tensioner shoe and wherein the plate has a top surface, a front surface, and a back surface, the plate having a first chamfer on an edge located at an intersection of the top surface and the front surface, and the plate having a second chamfer on an edge located at an intersection of the top surface and the back surface.

13. A product as set forth in claim 12 wherein the tensioner shoe is a one-piece structure comprised of a plastic material.

14. A product as set forth in claim 12 wherein the tensioner shoe is constructed and arranged so that a load exerted from the system chain is transferred to the piston via the front portion, the back portion, and the bridge portion.

15. A product comprising:
a tensioner including a housing, a piston extending from the housing, and a shoe carried by the piston, the shoe having a working surface that bears against a system chain during use of the tensioner, the shoe having a first side surface and a second side surface located opposite the first side surface, the shoe having a recess receiving at least a portion of the piston, the recess having an open end located in the first side surface, and the recess having a closed end opposite its open end in a direction toward the second side surface; wherein the tensioner includes a plate carried by the piston, the shoe is carried by the plate, the shoe has a hole receiving at least a portion of the plate, the hole has an open end located in the first side surface, and the recess is open to the hole in a direction toward the working surface; and wherein the plate has a top surface, a front surface, and a back surface, the plate having a first chamfer on an edge located at an intersection of the top surface and the front surface, and the plate having a second chamfer on an edge located at an intersection of the top surface and the back surface.

16. A product comprising:
a tensioner including a housing, a piston extending from the housing, and a shoe carried by the piston, the shoe having a working surface that bears against a system chain during use of the tensioner, the shoe having a first side surface and a second side surface located opposite the first side surface, the shoe having a recess receiving at least a portion of the piston, the recess having an open end located in the first side surface, and the recess having a closed end opposite its open end in a direction toward the second side surface; and
wherein the tensioner includes a plate carried by the piston, the shoe is carried by the plate, the shoe has a hole receiving at least a portion of the plate, the hole has an open end located in the first side surface, and the recess is open to the hole in a direction toward the working surface and wherein the hole has a second open end located in the second side surface.

* * * * *